United States Patent
Davis et al.

(10) Patent No.: US 9,594,717 B2
(45) Date of Patent: *Mar. 14, 2017

(54) METHOD AND APPARATUS TO FACILITATE SYSTEM TO SYSTEM PROTOCOL EXCHANGE IN BACK TO BACK NON-TRANSPARENT BRIDGES

(71) Applicant: INTEL CORPORATION, Santa Clara, CA (US)

(72) Inventors: Kimberly Davis, Phoenix, AZ (US); Mark Sullivan, Tempe, AZ (US); James Mitchell, Chandler, AZ (US); Patrick Themins, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,947

(22) Filed: Mar. 27, 2015

(65) Prior Publication Data
US 2015/0199294 A1  Jul. 16, 2015

Related U.S. Application Data

(63) Continuation of application No. 13/570,889, filed on Aug. 9, 2012, now Pat. No. 8,996,780, which is a continuation of application No. 12/238,427, filed on Sep. 25, 2008, now Pat. No. 8,244,951.

(51) Int. Cl.
*G06F 13/20* (2006.01)
*G06F 13/42* (2006.01)
*G06F 11/07* (2006.01)
*G06F 13/40* (2006.01)
*G06F 13/24* (2006.01)
*G06F 11/20* (2006.01)

(52) U.S. Cl.
CPC ...... *G06F 13/4221* (2013.01); *G06F 11/0709* (2013.01); *G06F 13/24* (2013.01); *G06F 13/4059* (2013.01); *G06F 11/0757* (2013.01); *G06F 11/2038* (2013.01); *G06F 11/2043* (2013.01)

(58) Field of Classification Search
CPC .. G06F 13/385; G06F 13/387; G06F 13/4004; G06F 13/36; G06F 13/38
USPC ......................................... 710/313, 305–306
See application file for complete search history.

(56) References Cited

U.S. PATENT DOCUMENTS

| | | |
|---|---|---|
| 4,954,988 A | 9/1990 | Robb |
| 6,006,301 A | 12/1999 | Tetrick |
| 6,175,888 B1 | 1/2001 | Guthrie et al. |
| 6,621,293 B2 | 9/2003 | Wingen |
| 6,622,191 B1 | 9/2003 | Nakamura |

(Continued)

OTHER PUBLICATIONS

German Patent and Trademark Office, German Office Communication Application No. 102009042868.2. Mail Date: Jan. 23, 2014.

(Continued)

*Primary Examiner* — Tim T Vo
*Assistant Examiner* — Kim T. Huynh
(74) *Attorney, Agent, or Firm* — Pillsbury Winthrop Shaw Pittman LLP

(57) ABSTRACT

A dual host system and method with back to back non-transparent bridges and a proxy packet generating mechanism. The proxy packet generating mechanism enables the hosts to send interrupt generating packets to each other.

17 Claims, 5 Drawing Sheets

Root Complex — NTB — Root Complex

(56) References Cited

U.S. PATENT DOCUMENTS

| | | | |
|---|---|---|---|
| 6,728,818 B2 | 4/2004 | Bakke et al. | |
| 7,234,004 B2 | 6/2007 | Raisch | |
| 7,293,129 B2 | 11/2007 | Johnsen et al. | |
| 7,295,543 B2 | 11/2007 | Kikuchi et al. | |
| 7,657,663 B2 | 2/2010 | Freimuth et al. | |
| 7,676,625 B2 * | 3/2010 | Cassiday | G06F 13/4022 710/305 |
| 7,694,025 B1 * | 4/2010 | Norrie | G06F 3/007 710/3 |
| 2003/0126348 A1 | 7/2003 | Jung | |
| 2008/0225871 A1 | 9/2008 | Paskett et al. | |

OTHER PUBLICATIONS

Chinese Office Action received Jan. 18, 2012.
State Intellectual Property Office (SIPO) of the People's Republic of China, Chinese 4th Office Action, Chinese Application No. 200910253073.0. Issue Date: Jun. 24, 2013. (6 pages).
Regula, Jack, "Using Non-transparent Bridging in PCI Express Systems", Jun. 1, 2004 (31 pages).

* cited by examiner

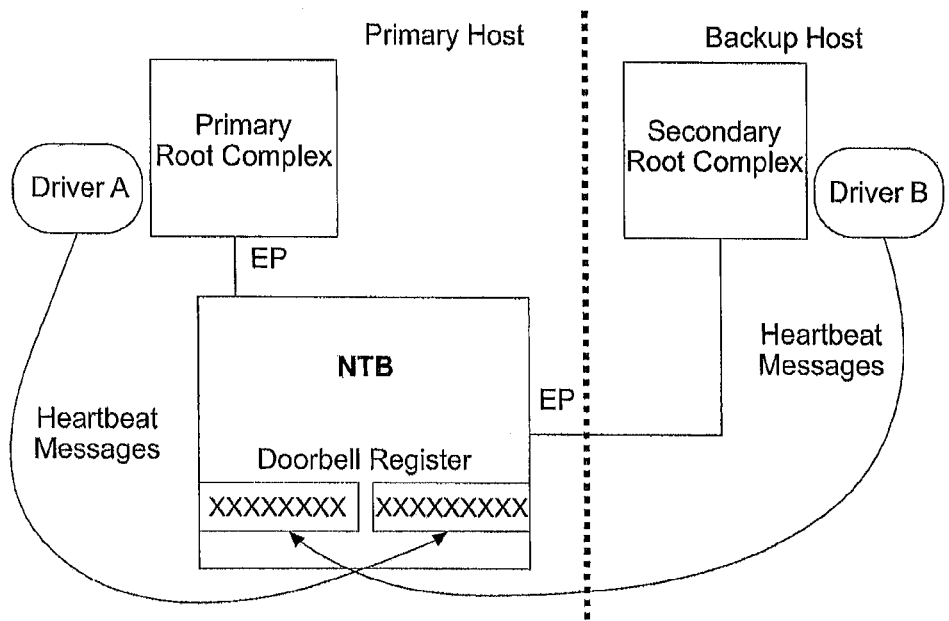

Fig. 1    Root Complex — NTB — Root Complex

| Primary Configuration Space | MMI/O Shadow Implementation Dependent | Secondary Configuration Space |
|---|---|---|
| Device ID   Vendor ID | | Device ID   Vendor ID |
| Primary BAR 0/1 | | Primary BAR 0/1 |
| Primary BAR 2/3 | Typically contains various | Primary BAR 2/3 |
| Primary BAR 4/5 | configuration registers | Primary BAR 4/5 |
| | found in both primary and | |
| | secondary configuration | |
| | space | |
| | | |

Fig. 2 : NTB Primary and Secondary Configuration Space

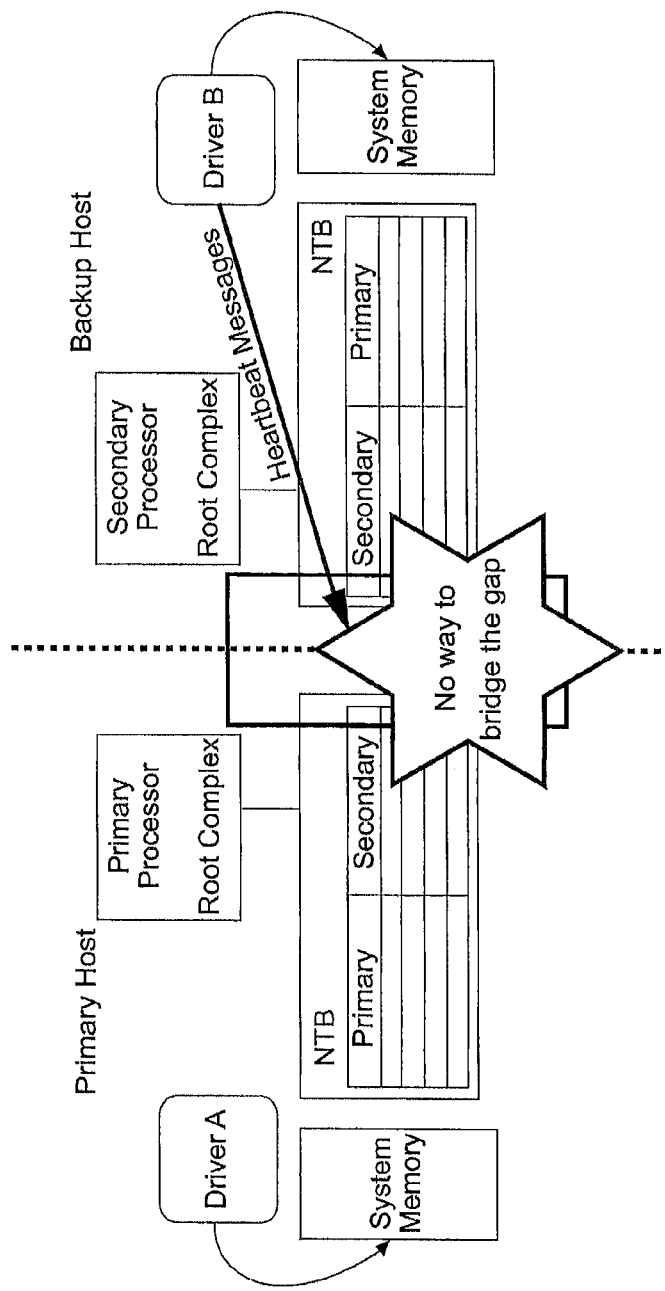
Fig. 3 : Back to Back: Root Complex to NTB Endpoint

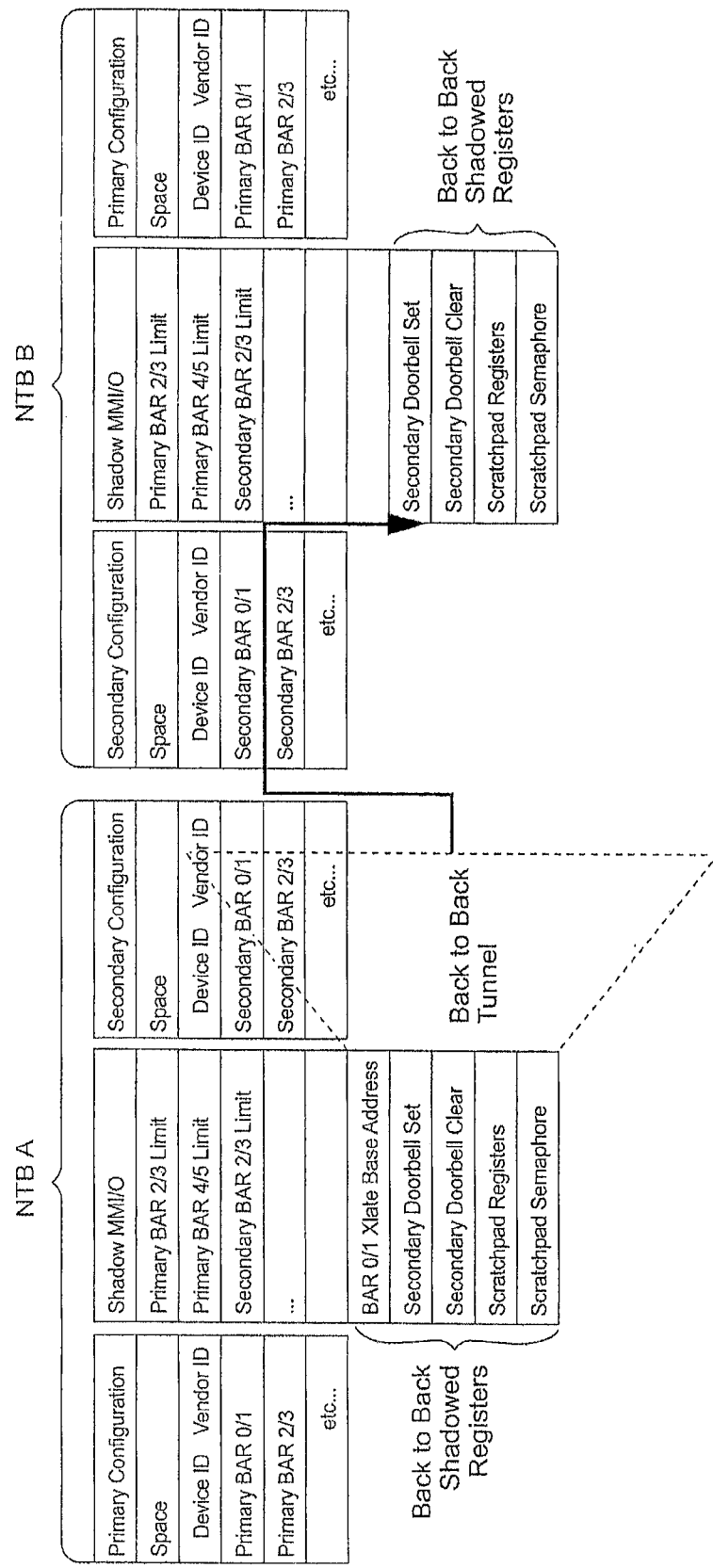
Fig. 4 : MMI/O Back to Back Communications

METHOD AND APPARATUS TO FACILITATE SYSTEM TO SYSTEM PROTOCOL EXCHANGE IN BACK TO BACK NON-TRANSPARENT BRIDGES

RELATED APPLICATION

This application is a continuation of U.S. application Ser. No. 13/570,889, filed Aug. 9, 2012, which is a continuation of U.S. application Ser. No. 12/238,427, filed Sep. 25, 2008, now U.S. Pat. No. 8,244,951, the entire contents of all of the foregoing applications are incorporated herein by reference in their entireties.

FIELD

Embodiments of the invention are generally related to distributed multi-processor architecture and in particular to dual host systems with back-to-back non-transparent bridges.

BACKGROUND

Peripheral Component Interconnect (PCI) is a second generation parallel bus architecture developed in 1992 as a replacement for the Industry Standard Architecture (ISA) bus. In the PCI standard, all the devices share the same bidirectional, 32-bit (or 64-bit), parallel signal path. The PCI bus brought a number of advantages over the ISA bus, including processor independence, buffered isolation, bus mastering, and true plug-and-play operation. PCI Express (PCIe) is a third generation general-purpose serial I/O interconnect designed to replace the PCI bus. Rather than being a bus, PCI Express is structured around point-to-point serial links called lanes.

The point-to-point serial link architecture of PCI Express is well suited for distributed processing via a distributed multiprocessor architecture model. Distributed processors are generally optimized to implement data packet processing functions. Unlike general-purpose central processing units (CPUs) that rely heavily on caching for improving performance, distributed processors have a lack of locality in packet processing and need for high-performance I/O that has pushed designers to come up with innovative architectures to reduce processing latency while still processing packets at high data rates.

BRIEF DESCRIPTION OF THE DRAWINGS

The invention may best be understood by referring to the following description and accompanying drawings that are used to illustrate embodiments of the invention.

FIG. 1 is a schematic diagram of a dual host system with one non-transparent bridge.

FIG. 2 is a schematic illustration of the configuration of the non-transparent bridge of FIG. 1.

FIG. 3 is a schematic diagram of a dual host system with two, back-to-back non-transparent bridges.

FIG. 4 is a schematic illustration of the configuration of the non-transparent bridge of FIG. 3.

DETAILED DESCRIPTION

Figure 5:
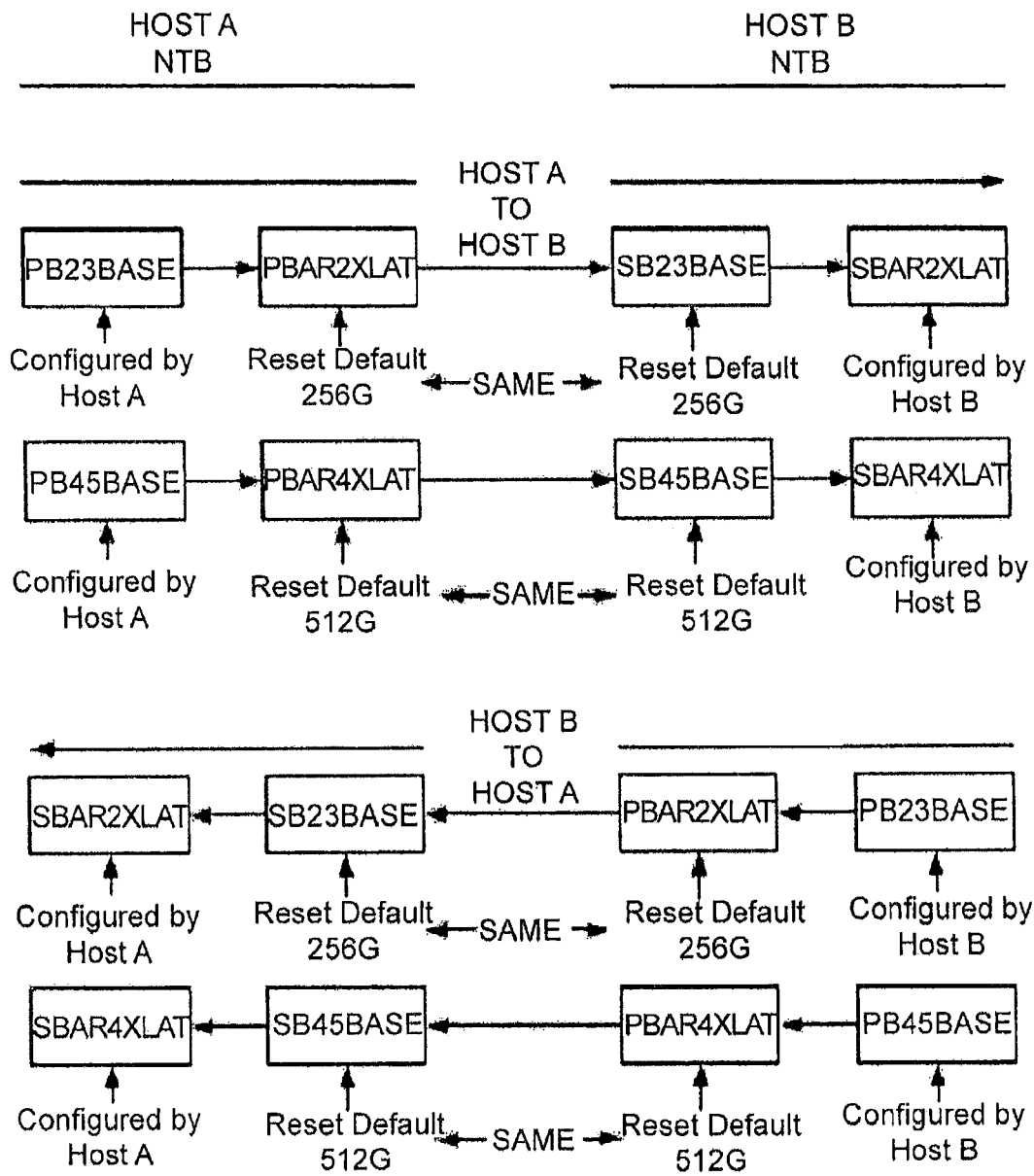
FIG. 5 is a diagram of register relationships according to an embodiment of the invention.

As used in the specification and claims, the singular forms "a", "an" and "the" include plural references unless the context clearly dictates otherwise. A "protocol" is a set of rules governing the format, syntax and order, of messages that are exchanged between at least two NTB subsystems. A "root complex" ("RC") is a PCI Express device that connects a processor (or central processing unit (CPU)) and memory to the PCI Express switch fabric. The root complex generates transaction requests on behalf of the processor. A "doorbell register" is a generic, typically 16 bit register that can be used by the controlling software of two NTB subsystems to define a type of protocol. The doorbell serves as an interrupt generating mechanism to alert a one of the hosts of a dual host system to the actions of the opposite host. "Scratchpad Registers" are a generic set of typically 32 bit registers that can be used for cross-system communication and the storage of data related to those communications.

A PCI Express non-transparent bridge (NIB) facilitates expansion of the distributed multiprocessor architecture model by functioning as a gateway between dual host systems. FIG. 1 is a schematic diagram illustrating a dual host system layout with a single non-transparent bridge 104. FIG. 2 illustrates the configuration of the non-transparent bridge 104 of the dual host system of FIG. 1. The dual host system illustrated in FIG. 1 includes a primary host system 100A and a backup host system 100B connected by a single non-transparent bridge 104. The primary host system 100A includes a primary processor 102A in a primary root complex 103A while the backup host system 100B includes a secondary processor 102B in a secondary root complex 103B. The non-transparent bridge 104 includes a primary side 106, a secondary side 108, and a memory mapped input/output (MMI/O) space 110 having shadow registers 112. The non-transparent bridge 104 appears as a PCI Express endpoint (EP) on each host system 100A, 100B after enumeration.

The primary host system 100A and a backup host system 100B typically communicate with each other via a protocol through a doorbell register (not shown) and a block of scratchpad registers (not shown) in MMI/O space 110 on the single non-transparent bridge 104. The primary and secondary host systems 100A, 100B use software, usually a device driver, to send messages to each other. One type of message could be a heartbeat message, which indicates the well-being of the software running on the host systems 100A, 100B. That is, the failure to receive a heartbeat in one of the host systems 100A, 100B would indicate catastrophic failure on the opposite host system 100A, 100B. Typically, a heartbeat message is delivered by a device driver that writes the heartbeat protocol message to the scratchpad register(s) and then writes to the doorbell register causing an interrupt to be delivered to the other host. That is, the interrupt notifies the host system 100A, 100B of the availability of the heartbeat message. In addition to simple heartbeat messages, the protocol may include other types of messages such as: implementing failover, moving windows, loading software, etc.

FIG. 3 illustrates a dual host system with two non-transparent bridges 104A, 104B in a back-to-back configuration (RC-NTB-NTB-RC) according to one embodiment of the invention. As in the dual host system illustrated in FIG. 1, this dual host system includes a primary host 100A with a primary processor 102A and a primary root complex 103A and a backup host 100B with a secondary processor 102B and a secondary root complex 103B. The dual host system illustrated in FIG. 3, however, includes two non-transparent bridges 104A, 104B.

The configurations of the non-transparent bridges 104A, 104B of the dual host system of FIG. 3 are illustrated in FIG.

4. The first non-transparent bridge 104A includes a first primary side 106A, a first secondary side 108A and a first memory mapped input/output (MMI/O) space 110A having first shadow registers 112A. The second non-transparent bridge 104B includes a second primary side 106B, a second secondary side 108B and a second memory mapped input/output (MMI/O) space 110B having second shadow registers 112B. The first shadow registers 112A include doorbell registers 114A and scratchpad registers 116A while the second shadow registers 112B include doorbell registers 114B and scratchpad registers 116B. The present embodiment also includes a proxy packet generating mechanism 120, between the first shadow registers 112A and the second shadow registers 112B. The proxy packet generating mechanism 120 is a explained in more detail below.

The back-to-back configuration of the first and second non-transparent bridges 104A, 104B eliminates bus enumeration problems that occur when the primary and backup systems 100A, 100B do not boot at the same time. Complexity, however, may arise for software when the non-transparent bridges 104A, 104B are placed back to back. Each host system's 100A, 100B enumeration software stops at the non-transparent bridge endpoint, resulting in an inaccessible secondary space created between the secondary sides 108A, 108B of the two host systems 100A, 100B. Therefore, the primary host system 100A has no knowledge of the secondary host system's 100B non-transparent bridge doorbell 114B and scratchpad 116B. The reverse is also true. While data can be moved between the primary and secondary host systems 100A, 100B through the PCIe inaccessible secondary spaces, interrupts cannot travel from one system to the other.

Embodiments the invention solve this problem by creating a proxy packet generating mechanism 120 between the secondary sides 108A, 108B of the two host systems 100A, 100B. The proxy packet generating mechanism 120 enables one host system 100A, 100B to send a PCIe interrupt generating packet through the MMI/O– inaccessible area into the opposite non-transparent bridge 104A, 104B, effectively giving each host system 100A, 100B a tunnel into the other systems MMI/O spaces 100A, 100B. The interrupt can be generated by accessing and writing the scratchpad registers 116A, 116B and the interrupt generating doorbell registers 114A, 114B.

Figure 6:
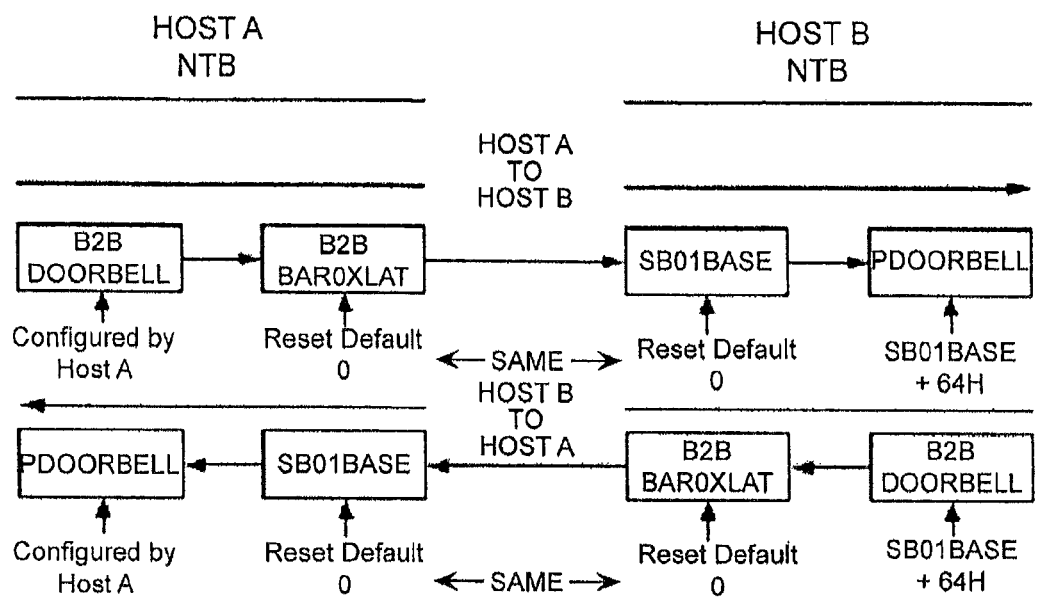
FIG. 6 is a diagram of register relationships according to an embodiment of the invention.

One method according to one embodiment of the invention can be explained with the help of FIG. 4. The proxy packet generating mechanism 120 enables each of the back to back non-transparent bridges 104A, 104B to negotiate ownership of the back to back shadow registers 112A, 112B. Upon seeing an assert change in state in a back to back shadow "set" doorbell register 114A in the first non-transparent bridge 104A, logic in the first non-transparent bridge 104A creates a posted memory write packet (proxy packet) which contains the back to back shadow registers 112A in the payload of the posted memory write. Further, the first non-transparent bridge 104A sends the posted memory write packet across the inaccessible secondary space. The second non-transparent bridge 104B decodes the posted memory write as its own and then updates its local shadow doorbell registers 114B accordingly. The second non-transparent bridge 104B senses a change in state of back to back shadow "set" doorbell register 114B and generates an upstream interrupt (for example, MSI/MSI-X, or INTx) depending on what interrupt mechanism is selected. Embodiments of the invention include additional registers in addition to the proxy packet generating mechanism 120. Examples of the additional registers are illustrated in FIGS. 5 and 6 and explained in more detail in the examples below.

Examples

Heartbeat Protocol

In this embodiment of the invention, a heartbeat protocol is communicated from the primary host system 100A to the backup host system 100B. A typical heartbeat protocol allows primary host system 100A to inform backup host system B that it is "alive and well," In other words, a healthy link exists between them. Although the following example illustrates a heartbeat from the primary host system 100A to the backup host system 100B, the heartbeat protocol can be bi-directional. That is, the heartbeat protocol can be configured to send and receive heartbeat messages to and from the primary host system 100A and the backup host system 100B.

In the first step of the method, the primary host system 100A sets one or more agreed upon bit(s) in the first doorbell register 114A. When the hardware on the primary host 100A senses that the first doorbell 114A has been set, it creates a posted memory write (an interrupt proxy packet). The first non-transparent bridge 104A then sends the posted memory write across the inaccessible secondary space to the second non-transparent bridge 104B on backup host system 100B. The transaction is received by the secondary side 106B of the second non-transparent bridge 104B through the SB01BASE window of the second non-transparent bridge 104B in host system 100B.

The hardware in the second non-transparent bridge 104B in the backup host system 100B then decodes the posted memory write as its own and sets the equivalent bits in the primary doorbell register 114B in the second non-transparent bridge 104B in the backup host system 100B. On seeing the primary doorbell register 114B being set, the second non-transparent bridge 104B generates an upstream interrupt based on whether INTx or MSI or MS1-X is enabled and not masked. This interrupt could be set, for example, at a predetermined periodic rate such as every 1 second.

Offload Protocol

In an offload protocol, the primary host system 100A wishes to off load some packet processing to the backup host system 100B. Broadly, the offload protocol comprises three main steps which each typically comprise multiple substeps. The main steps comprise (1) sending the packets to be worked on from the primary host system 100A to the backup host system 100B, (2) sending a message which includes various information about the packets such as where the packets have been loaded into memory, length, type of work to be done, etc. from the primary host system 100A to the backup host system 100B, and (3) sending from the primary host system 100A to the backup host system 100B an interrupt proxy packet to tell the backup system host 100B that there is work to be done.

Send Packets to Work on

First, the Primary host system 100A writes the off-load packets to the primary BAR ⅔ window of the first non-transparent bridge in primary host system 100A. The first non-transparent bridge 104A then translates the packets to an agreed upon base address PBAR2XLAT and sends the packets. The second non-transparent bridge 104B in the backup host system 100B receives the packets at the same base address SB23BASE (PBAR2XLAT=SB23BASE). The packets are then translated into the backup host system's 100B domain using SBAR2XLAT and sent to system memory.

Send Message Detailing where Transactions have been Loaded into Memory, Length, Type of Work to be Done, Etc.

The primary host system 100A writes an agreed upon message into the first scratchpad registers 116A in the first non-transparent bridge 104A in the primary host system 100A. The hardware in the non-transparent bridge 104A, upon sensing a write to the scratchpad registers 116A, schedules a posted memory write targeting the scratchpad register 116B in backup host system 100B, via back to back BAR0XLAT. The message is received on the secondary side of the second non-transparent bridge 104B on the opposite side of the inaccessible secondary space through the SB01BASE window of the second non-transparent bridge 104B in backup host system 100B. Hardware in the backup host system's 100B non-transparent bridge 104B decodes the posted memory write as its own and sets the desired scratchpad register bit(s) 116B in the non-transparent bridge 104B in the backup host system 100B.

Send Interrupt Proxy Packet to Tell Backup Host System 100B that there is Work to be Done The primary host system 100A sets a selected bit in the back to back doorbell register 116A. Hardware on primary host system 100A senses that the back to back doorbell has been set and creates a posted memory write and sends it across the inaccessible secondary space to the second non-transparent bridge 104B on backup host system 100B. The posted memory write is received by the secondary side 108B of the non-transparent bridge 104B through the SB01BASE window of the non-transparent bridge 104B in the backup host system 100B. The hardware in the second non-transparent bridge 104B decodes the posted memory write as its own and sets the equivalent bits in the primary doorbell register 114B, The hardware in the second non-transparent bridge 104B, upon seeing the bit(s) the primary doorbell 104B being set, generates an upstream interrupt based on whether INTx or MSI or MSI-X is enabled and not masked. The interrupt service routine in the backup host system 100BB decodes the interrupt and reads the message in the scratchpad 116B in the non-transparent bridge 104B on backup host system 100B. This message contains information such as the location and length of the transactions to work on and any may include any other relevant information needed to handle the request. Optionally, an acknowledge packet could be sent back to primary host system 100A when this is completed.

The various embodiments of the invention described herein simplify many problems for software in dual host systems having back to back non-transparent bridges. Absent a proxy packet generating mechanism 120, the solution around the tunnel problem would involve a highly proprietary software solution duplicating the original functionality and intent of doorbell 114A, 114B and scratchpad register 116A, 116B sets in each system's memory. A complex protocol would be required for driver to driver communications. The result would be increased complexity, asynchronous communication problems, reduced software reusability and scalability, and longer debug cycles. With the proxy packet generating mechanism 120, however, the device driver developer is able to more easily design a protocol by which heartbeat messages and scratchpad data can be communicated across the back to back non transparent bridges 104A, 104B. Example protocol messages for which this is advantageous include, but are not limited to, host fail-over applications, journaling, checkpoint data, and offload computations such as cryptography.

While the invention has been described in tem1s of several embodiments of the invention, those of ordinary skill in the art will recognize that the invention is not limited to the embodiments of the invention described, but can be practiced with modification and alteration within the spirit and scope of the appended claims. The description is thus to be regarded as illustrative instead of limiting.

What is claimed is:

1. A device comprising:
   a first non-transparent bridge comprising a shadow register, wherein the first non-transparent bridge is adapted to create a packet including a payload of a posted memory write and send the packet to a second non-transparent bridge based on an assert change in state in the shadow register, wherein at least a portion of the second non-transparent bridge is inaccessible to the device and at least a portion of the first non-transparent bridge is inaccessible to a second device including the second non-transparent bridge.

2. The device of claim 1, the shadow register comprises at least one of a doorbell register, and a scratchpad register, wherein the packet is created and sent based on an assert change in state in the doorbell register.

3. The device of claim 1, wherein the first non-transparent bridge further comprises a memory mapped input-output (MMI/O) area, the MMI/O area comprising the shadow register.

4. The device of claim 1, wherein the first and second non-transparent bridges are arranged in a back to back configuration and wherein the device is configured to send the packet using a proxy packet mechanism that is configured to enable the device and the second device to exchange packets through each other's inaccessible non-transparent bridge portion.

5. The device of claim 1, wherein the first non-transparent bridge includes a PCIe non-transparent bridge.

6. A device comprising:
   a first non-transparent bridge comprising a shadow register, wherein the first non-transparent bridge is adapted to receive a packet including a payload of a posted memory write from a second non-transparent bridge, decode the posted memory write as its own, and update the shadow register, wherein at least a portion of the second non-transparent bridge is inaccessible to the device and at least a portion of the first non-transparent bridge is inaccessible to a second device including the second non-transparent bridge.

7. The device of claim 6, wherein the shadow register comprises a doorbell register, and the first non-transparent bridge is further adapted to sense a change in state of the doorbell register and generate an upstream interrupt.

8. The device of claim 6, wherein the first non-transparent bridge includes a PCIe non-transparent bridge.

9. The device of claim 6, wherein the first and second non-transparent bridges are arranged in a back to back configuration and wherein the device is configured to receive the packet using a proxy packet mechanism that is configured to enable the device and the second device to exchange packets through each other's inaccessible non-transparent bridge portion.

10. A method comprising:
    setting an assert change in state in a shadow register of a first non-transparent bridge;
    creating a packet including a payload of a posted memory write; and
    sending the packet to a second non-transparent bridge, wherein at least a portion of the second non-transparent bridge is inaccessible to a first host including the first non-transparent bridge and at least a portion of the first non-transparent bridge is inaccessible to a second host including the second non-transparent bridge.

11. The method of claim 10, wherein the first and second non-transparent bridges are arranged in a back to back configuration.

12. The method of claim 10, wherein said sending includes sending the packet using a proxy packet mechanism configured to enable the first host and the second host to send the packet to each other through the each other's inaccessible non-transparent bridge portion.

13. A method comprising:
   receiving a packet including a payload of a posted memory write at a first non-transparent bridge comprising a shadow register from a second non-transparent bridge;
   decoding the posted memory write; and
   updating the shadow register,
   wherein at least a portion of the second non-transparent bridge is inaccessible to a first host including the first non-transparent bridge and at least a portion of the first non-transparent bridge is inaccessible to a second host including the second non-transparent bridge.

14. The method of claim 13, wherein the first and second non-transparent bridges are arranged in a back to back configuration and wherein said receiving includes receiving the packet using a proxy packet mechanism configured to enable the first host and the second host to send the packet to each other through the each other's inaccessible non-transparent bridge portion.

15. A system comprising:
   a first host comprising a first non-transparent bridge, wherein the first non-transparent bridge is adapted to create a packet including a payload of a posted memory write based on an assert change in state in a first shadow register; and
   a second host comprising a second non-transparent bridge,
   wherein at least a portion of the second non-transparent bridge is inaccessible to the first host and at least a portion of the first non-transparent bridge is inaccessible to the second host,
   wherein the first non-transparent bridge is further configured to send the packet to the second non-transparent bridge, and
   wherein the second non-transparent bridge is adapted to decode the posted memory write as its own, update a second shadow register, detect a change in state of the second shadow register, and generate an upstream interrupt.

16. The system of claim 15, wherein the first and second non-transparent bridges are arranged in a back to back configuration.

17. The system of claim 15, further comprising a proxy packet mechanism arranged between the first non-transparent bridge and the second non-transparent bridge, wherein the proxy packet mechanism is configured to enable the first host and the second host to send the packet through the each other's inaccessible non-transparent bridge portion.

* * * * *